United States Patent [19]
Rosenshein et al.

[11] Patent Number: 5,272,652
[45] Date of Patent: Dec. 21, 1993

[54] EXPANDED FIELD OF VIEW (EFOV) DISPLAY FOR REAL-TIME, MANNED, INTERACTIVE AIR COMBAT SIMULATION, INCLUDING CLOSE-IN COMBAT

[75] Inventors: Leon Rosenshein, Torrance; James R. Cobasko, Redondo Beach; Donald I. Farmer, Huntington Beach; Steven M. Mosher, Long Beach; Andrew M. Skow, Rolling Hills Estates; Robert C. Ettinger, Palos Verdes Estates; Urban H. D. Lynch, Long Beach, all of Calif.

[73] Assignee: Eidetics International, Torrance, Calif.

[21] Appl. No.: 786,736

[22] Filed: Nov. 1, 1991

[51] Int. Cl.⁵ .................. G09B 9/00; G06F 15/44
[52] U.S. Cl. ..................... 364/578; 434/30; 434/38; 273/442
[58] Field of Search ............... 364/578, 516; 472/130; 273/434, 442; 434/30, 37, 38, 43, 19; 358/104, 183; 395/119, 152, 157

[56] References Cited

U.S. PATENT DOCUMENTS

| | | | |
|---|---|---|---|
| 4,527,980 | 7/1985 | Miller | 434/55 |
| 4,641,255 | 2/1987 | Hohmann | 364/522 |
| 4,752,836 | 6/1988 | Blanton et al. | 358/342 |
| 5,040,067 | 8/1991 | Yamazaki | 358/183 |
| 5,099,331 | 3/1992 | Truong | 358/183 |
| 5,137,450 | 8/1992 | Thomas | 434/44 |
| 5,184,956 | 2/1993 | Langlais et al. | 434/69 |
| 5,202,765 | 4/1993 | Lineberry | 358/183 |

OTHER PUBLICATIONS

Nordwall, Bruce; *Aviation Week & Space Technology*, "Hughes Develops Unusual Design to Meet Navy Requirements for Osprey Simulator", Sep. 2, 1991, pp. 59–61.

Microsoft Flight Simulator *Information Manual and Flight Handbook*, 1989, pp. 4–36 and 130–140.

*Primary Examiner*—Jack B. Harvey
*Assistant Examiner*—Brian M. Buroker
*Attorney, Agent, or Firm*—Blakely, Sokoloff, Taylor & Zafman

[57] ABSTRACT

An expanded field of view visual display concept capable of conducting credible close-in or within visual range (WVR) air-to-air combat from a single computer graphics display screen. By use of the invention, the visual scene content that normally exists outside and around the cockpit of a fighter aircraft can be condensed onto a single CRT screen or video projection screen in such a manner that pilots have good situational awareness, even in close-in-combat, and can fly credible air combat. An expanded field of view visual display is created, referred to as target coordinate display (TCD), capable of conducting credible close-in simulated air combat from a single CRT display or video projection screen. The display handles multiple aircraft, shows friendly aircraft formations, is usable in real time, shows weapon release information, is easily adapted to by pilots, and yields credible air combat simulation results.

7 Claims, 2 Drawing Sheets

EXPANDED FIELD OF VIEW (EFOV) DISPLAY FOR REAL-TIME, MANNED, INTERACTIVE AIR COMBAT SIMULATION, INCLUDING CLOSE-IN COMBAT

BACKGROUND

Flight simulators are widely used in the aerospace industry and government for requirements definition, design development, and pilot training. By using the proper simulation, an aerospace designer can project the capabilities of advanced technologies into the future with confidence. With credible simulations, those responsible for establishing the requirements of new aircraft can accurately develop the specifications for such aircraft. Accurate simulations are essential to training aircrews to fly new aircraft and for training personnel in existing aircraft. Aircraft simulations form a very significant part of the aerospace research, development and training community. Large amounts of money are spent to make flight simulations more realistic and effective. As the cost of fuel continues to increase, there is created a greater need for credible flight simulation for pilot training and pilot currency. This trend toward increased simulation training is readily apparent in the airline industry and the military. Simulation of hazardous and expensive military missions such as combat and weapons employment make more and more sense from both a safety and financial standpoint.

One of the most difficult tasks to realistically and adequately simulate is air-to-air combat. Close-in or within visual range (WVR) air-to-air combat is the most difficult subset of air combat to simulate, particularly when multiple aircraft representations are required.

Simulators designed for air-to-air combat are usually large, expensive and complex devices with both head-down cockpit mock-ups complete with active controls and displays and head-up, out of the cockpit visual displays. The out of the cockpit visual display typically has a horizon referenced earth-sky projection system and a separate target projection system which shows the azimuth, elevation, size and attitude of adversary aircraft in the hemisphere above the plane of the wings of the aircraft being simulated. The size of the adversary or target aircraft is used to visually estimate the range to the target just as in actual air-to-air combat. Simulations of this type require surrounding the cockpit with large domes onto which video or computer generated images are projected, or multiple CRT's honeycombed and coordinated in such a manner as to provide a continuous outside the cockpit view. These methods of providing out of cockpit visual displays suitable for air-to-air combat are very expensive in both hardware and software. As a direct result of their high cost, simulators of this type have been used to simulate only a limited number of combatants, usually only one versus one (1v1).

With today's technology of all-aspect air-to-air missiles, low observable aircraft and high maneuver rate aircraft, simulating a large number of aircraft in close-in air-to-air engagements is becoming more and more important. It is necessary to simulate a multiple aircraft flight engaging many adversary aircraft (e.g., M aircraft on one side versus N aircraft on the other side) in a large scale MvN air battle in order to enable correct design decisions, to establish critical requirements for future aircraft, and to adequately train aircrews in realistic military missions. Aircrews preparing for combat of the future should be able to train realistically in the large scale air battles which they expect to encounter. Currently, the cost of building many multiple dome or other effective simulations to accomplish this task for research, development, and training is prohibitive.

Thus, low cost, manned, interactive crewstations with displays that provide credible close-in combat are clearly needed to meet the critical needs of research, development and training. Manned, interactive crewstations have successfully been developed and used in simulating beyond visual range (BVR) combat. However, the displays in these BVR stations do not provide adequate information for the dynamic maneuvering of close-in within visual range (WVR) combat. The key to developing a manned, interactive crewstation capable of credible close-in combat is the development of an expanded field-of-view (EFOV) graphics display which provides the information content to the pilot equivalent to that provided in an expensive domed air combat simulation.

SUMMARY OF THE INVENTION

According to the present invention, the key elements needed to develop and evaluate an expanded field-of-view (EFOV) display capable of credible simulations of close-in air-to-air combat are as follows:

1) An understanding of air-to-air combat maneuvering from an experienced fighter pilot's perspective.

2) An understanding of the key visual cueing elements and information content important to the pilot in close-in air-to-air combat.

3) Computer graphics expertise to program the proposed display concepts on a graphics computer workstation.

4) A cockpit development station (CDS) such as an F-16 cockpit representation with functioning stick and throttle connected to a high fidelity 6-DOF (degree of freedom) aerodynamic and flight control simulation model.

This invention is directed to display concepts for field-of-view (FOV) expansion for air combat simulations. The invention is an expanded FOV visual display concept capable of conducting credible close-in or within visual range (WVR) air-to-air combat from a single computer graphics display screen.

By use of the present invention, the visual scene content that normally exists outside and around the cockpit of a fighter aircraft can be condensed onto a single CRT screen or video projection screen in such a manner that pilots have good situational awareness, even in close-in-combat, and can fly credible air combat. Such a single screen display concept, capable of credible air-to-air combat simulation, is the enabling technology for low-cost, manned, interactive crew stations to supplement existing simulations with multiple participants, many versus many air battle simulations to evaluate new technology concepts, and large scale air battle simulations for tactics development and training.

The objective of the invention is to create an expanded field of view visual display, referred to as target coordinate display (TCD) capable of conducting credible close-in simulated air combat from a single CRT display or video projection screen. The display can handle multiple aircraft, show friendly aircraft formations, is usable in real time, show weapon release information, is easily adapted to by pilots, and yields credible air combat simulation results.

DETAILED DESCRIPTION OF THE INVENTION

Expanded Field-of-View (EFOV) Concepts

Existing single screen, off-the-shelf technology displays for flight training simulations consist of a nominal 40° azimuth by 30° elevation display centered around the forward fuselage reference line of an aircraft. Superimposed on this front field of view display, properly scaled, are all the elements of a classic head-up display including airspeed, altitude, attitude, horizon, flight path marker, target marker box, aiming reference, missile range analog, and the like. This display also shows the outside world horizon with the earth green and the sky blue, adversary aircraft targets in their proper azimuth, elevation, attitude and size when they are in the nominal 40×30 field-of-view. This nominal front or "kill" display is used for the terminal part of any close-in engagement. It is the goal of the simulator pilot to maneuver his aircraft to place his adversary within this front "kill" position. The expanded field of view concept of the present invention evolved from this control display. As the primary adversary aircraft and other participants of the engagement move outside the edge of this nominal front field of view display, an expanded field of view concept is needed to allow the simulator pilot to monitor the position of his adversary and other aircraft and also maneuver his aircraft properly with respect to them.

The invented TCD concept evolved from an air combat analysis tool called Piloted Agile AASPEM or PAA. PAA is a non-real time piloted air combat engagement model which can be equated to a fighter pilot's chess game. The information content necessary to describe the relative position of other aircraft in a dogfight in PAA is a combination of digital information (relative roll angle, antenna train angle, range, etc.) and graphical information (relative attitude). PAA differs from the present invention in that it is not a real time system, does not utilize realistic out the window graphics, and does not utilize the TCD display.

Figure 1:
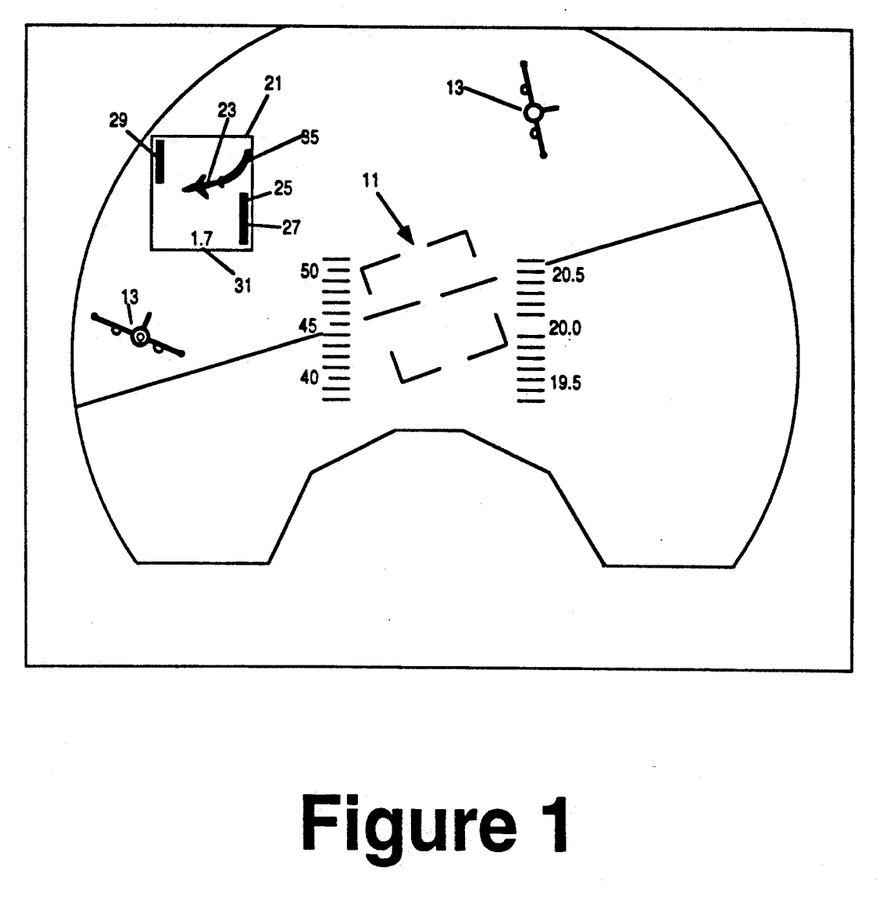
FIG. 1 is a representation of a computer generated display utilizing the invented TCD concept.

In the TCD concept, the front or kill zone field of view display comprises a normal head-up display 11 superimposed over the outside view of the terrain, horizon, and the other aircraft 13 currently within the field of view as shown in FIG. 1 (for simplicity, the terrain portion of the display is not shown in FIG. 1). The size of this field of view depends upon the size of the video screen being used. A 19" CRT, positioned 21" from the pilot's eyes yields a nominal 17° half angle view. A video projection on a 60 inch screen 45 inches from the pilot's eyes yields a nominal 40° half angle view. This field can be made even wider with larger projections or multiple projections/CRT's. The TCD concept is applicable to any size field of view which is not continuous for 360° in azimuth.

When the target, or any other aircraft, exits the frontal field of view, a "viewing port" or "window" 21, with a view of the target 23 in the proper perspective and size, is shown at the correct roll or maneuver plane of the target/aircraft relative to the pilot's ownship. The view of the target displayed in this window is the same as though the pilot turned his head to look directly at the target.

An analog bar 25 at the edge of the window graphically displays the Antenna Train Angle (ATA) from the nose of the pilot's ownship to the target. When the analog bar is at full length (i.e., extends to the top of the window), the target is 180° off the nose, or directly behind, in the 6 o'clock position. As the target moves toward the nose of the pilot's ownship, the analog bar decreases in length toward a mark 27 in the bar which corresponds to the edge of the frontal field of view. When this mark is reached by the bar, the target enters the pilot's frontal field of view and the target window disappears from view.

A second analog bar 29 at the other edge of the window graphically displays the ATA from the nose of the target, or other aircraft, to the pilot's ownship. Full extension (i.e., to the bottom of the window) of this bar indicates 180° ATA, which means that the target is pointing directly away from the pilot's ownship (or is no immediate threat). As the target maneuvers to point at the pilot's ownship, the analog bar deceases in length appropriately. The analog bar is at zero length when the target is pointing directly at the ownship.

A digital number 31 at the bottom of the window, indicates the range to the target in nautical miles. This number is displayed in tenths of a mile increments.

The position of the target window along the edge of the field of view clearly indicates the roll or maneuver plane of the target relative to the pilot's ownship. Rolling to place the window at the 12 o'clock position in the field of view places the target within the maneuver plane, or in other words, puts the lift vector on the target in the most efficient position for bringing the target back into the frontal field of view for weapons employment. If the target is just outside the field of view, the analog bar will extend just beyond the field of view marker. Pulling, in pitch, to decrease the ATA will bring the target into the field of view, and the target window will disappear.

If the ATA is near 180° i.e., the target is near the 6 o'clock position, the target window is positioned on the edge of the field of view in the position which shows the closest direction to turn to point at the target. As the pilot rolls ownship toward the window, the window moves toward the 12 o'clock position and, pulling in pitch, will move the target toward the frontal field of view. This assumes that the adversary target has less maneuver capability than the pilot's ownship. Otherwise, the adversary may maneuver aggressively and frustrate the efforts to bring him into the frontal field of view.

The analog bar which indicates the ATA from the target's nose to the pilot's ownship is a good indication of the threat potential of the adversary. If the analog bar is near full extension, it indicates that the adversary is pointed away and cannot fire any lethal weapons for the moment. If the bar is 30°-45° (i.e., 1/6 to ¼ of full length), and decreasing, and the adversary is within weapons firing range, he is very threatening and must be countered. Also, the rates at which the analog bars 25 and 29 are decreasing (or increasing) provide a good indication of who is maneuvering the most effectively. If the bar 25 representing the pilot's ownship is shorter and decreasing as rapidly as the opponent's, it indicates that the pilot can achieve a weapons launch prior to his adversary. On the other hand, if the reverse is true, the pilot should consider alternate tactics, because he is currently losing the offensive and will soon become defensive unless something changes.

When multiple targets are present outside the field of view, each will have its own window. If two or more of these windows are positioned in the same relative roll plane, the one representing the target which is most threatening (i.e. is closest in range with an ATA of less than 45°) will be displayed on top of the others.

In the TCD display concept, the portion of the outside field of view normally blocked by the structure of the simulated aircraft (such as canopy bow, canopy rails, aircraft nose) are not shown to the pilot.

An additional optional feature of the display is the capability to show flight path ribbons 35 behind each aircraft. These ribbons are visible whether the aircraft are in the frontal field of view or in the viewing "window" when the target is outside the field of view. These ribbons provide an additional cue to the simulator pilot to help compensate for the lack of 3-dimensional situational awareness available in a dome or actual flight.

Figure 2:
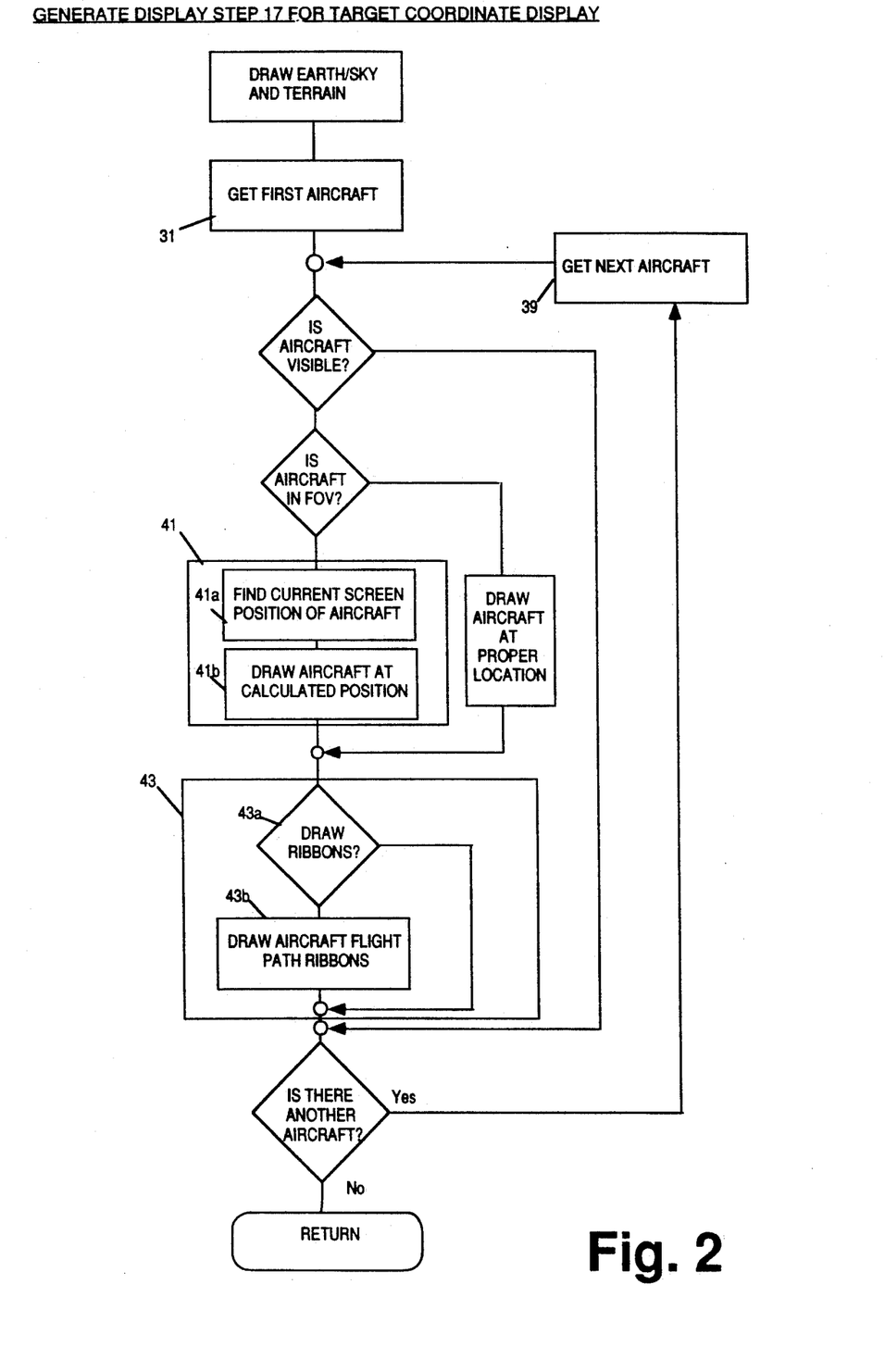
FIG. 2 is a flowchart of the flight simulator software used in the present invention.

A flow chart for implementing the TDC concept in a flight simulation program is shown in FIG. 2. In this connection, excepting for the portions within boxes 41 and 43, software for implementing the flow chart is well known to persons skilled in the field of the invention and, therefore, the details will not be described herein. Of course, the program would need to be adapted to the particulars of the environment in which it is utilized. For example, the decision Is Aircraft in FOV? would need to include a test to determine the predetermined nominal half angle view (i.e., 17° for a 19 inch CRT positioned 21 inches from the pilot's eyes, or 40° for a video projection on a 16 inch screen 45 inches from the pilot's eyes.)

Referring now to the processing performed in block 41, the screen position of the current aircraft is determined as follows:

X coordinate = X screen center + screen radius*sin (DRoll)

Y coordinate = Y screen center + screen radius × cos (DRoll)

Where DRoll is the relative roll angle to the target aircraft, X screen center is ½ screen width in pixels, Y screen center is ½ screen height in pixels and screen radius is 0.9 * X screen center.

In block 41b, the aircraft is drawn at the calculated position, including the analog bar displaying the ATA from the nose of the pilot's ownship to the target and the ATA from the nose of the target to the pilot's ownship. The X coordinate and Y coordinate are used as the center point for the aircraft in the target display window. The size of the target display window is fixed but is made proportional to the display being used such that its height is 150 pixels and its width is 150 pixels.

The steps performed by block 43 include a test 43a which determines whether the draw ribbons option has been selected. If the option has been selected, step 43b draws the flight path ribbons for the current aircraft as follows by drawing a series of connected polygons whose corners are defined by the position of the aircrafts wingtips over the last 10 seconds. A source code description of functions performed by blocks 41 and 43 are attached hereto as Appendix 1. In particular, for completeness of the functions shown in FIG. 2 are covered in the listing of Appendix 1. The DRAW_SKY() routine draws the earth/sky grid and terrain. The DRAW_VISIBLE_AC() routine draws an out the window view with a normal view out to 17° off the nose of the ownship (the ATA). For ATA larger than 17°, draws the target in the proper roll plane and display ATA both graphically and as a number. The DRAW_VISIBLE_AC() routine calls the DRAW_TCD_PLANE(this object) routine which draws aircraft which are visible, but outside the 17° nominal field of view. The DRAW_TCD_PLANE(this object) routine also calls the routine DRAW_PLANE(this object) for planes in the field of view. The routine DRAW_RIBBONS(obj) draws flight path ribbons if this option is selected.

APPENDIX 1

```
#include "system.h"
#include "const.h"
#include "network.h"
#include "objects.h"
#include "manned.h"
#include "colors.h"
#include "rel_geom.h"

float skymesh[][3] = {
       -40.0 * NM_TO_FT,  -100.0 * NM_TO_FT,   0.0,
       100.0 * NM_TO_FT,  -100.0 * NM_TO_FT,   0.0,
       -45.0 * NM_TO_FT,                0.0,  -33.0 * NM_TO_FT,
       100.0 * NM_TO_FT,                0.0,   0.0,
       100.0 * NM_TO_FT,   100.0 * NM_TO_FT,   0.0,
       -40.0 * NM_TO_FT,   100.0 * NM_TO_FT,   0.0};

float gmesh[][2] = {
       -1024.,    0.0,
       -1024., -1400.,
        1024., -1400.,
        1024.,    0.0};

float smesh[][2] = {
       -1024.,    0.0,
       -1024.,  1400.,
        1024.,  1400.,
        1024.,    0.0};

struct object *tcd_obj;
```

```
/*******************************************************************************/
/*                                                                             */
/*                                DRAW_SKY                                     */
/*                                                                             */
/*      Draw the earth sky grid for the TCD.                                   */
/*                                                                             */
/*******************************************************************************/
DRAW_SKY()
{
   register int i;
   Matrix mat;

/*--------------------------------*/
   /* Draw Earth/Sky and grid smartly */
   /* If nose is high clear to sky    */
   /* and draw ground otherwise clear */
   /* to ground and draw sky          */
   /*--------------------------------*/
   pushviewport();
   pushmatrix();
   viewport (0, XMAXSCREEN-2, 0, YMAXSCREEN);
   mmode (MPROJECTION);
   getmatrix (mat);
   ortho2 (0., 1279., 0., 1023.);
   mmode (MVIEWING);
   loadmatrix (Identity);

if (ownship->theta > (HUD_Y - YMIDDLE) / HORIZON_FACTOR * RTD)
   {
      c3f (skyblue);
      clear();

translate (640., HUD_Y, 0.);
      rot (ownship->phi, 'z');
      /*--------------------------------------------*/
      /* Convert degrees to pixels and translate. */
      /*--------------------------------------------*/
      translate (0.0,
                 -ftan (ownship->theta * DTR) * HORIZON_FACTOR,
                 0.0);
      c3f (green1);
      bgnpolygon();
         v2f (gmesh[0]);

v2f (gmesh[1]);  (gmesh[4]);
         v2f (gmesh[2]);
         v2f (gmesh[3]);
      endpolygon();
   }
   else
   {
      c3f (green1);
      clear();
      translate (640., HUD_Y,0.0);
      rot (ownship->phi, 'z');
      translate (0.0,
                 -ftan (ownship->theta * DTR) * HORIZON_FACTOR,
                 0.0);
      c3f (skyblue);
      bgnpolygon();
         v2f (smesh[0]);
         v2f (smesh[1]);
         v2f (smesh[2]);
         v2f (smesh[3]);
      endpolygon();
   } mmode (MPROJECTION);
loadmatrix (mat);

mmode (MVIEWING);
popmatrix();
popviewport();

/*------------------------------------------------------------*/
/*    Draw reference grid - each square is 5 miles on a side  */
/*------------------------------------------------------------*/
c3f (black);
for (i = 0;i<=2*NUM_GRID_LINES;i++)
{
```

```
        bgnline();
            v3f (grid1[i]);
            v3f (grid2[i]);
        endline ();

bgnline();
            v3f (grid3[i]);
            v3f (grid4[i]);
        endline ();
    }
    /*------------------------*/
    /* Draw the runway, Maybe */
    /*------------------------*/
    if (shaded_sky) DRAW_RUNWAY();
}

/**********************************************************************
/*                          DRAW_VISIBLE_AC                            *
/*    Draw an OTW view with normal view out to 17 degrees off the nose (ATA).  *
/* For ATA larger than 17 draw the target in the proper roll plane and display ATA *
/* both graphically and as a number.                                   *
/*                                                                     *
/**********************************************************************
DRAW_VISIBLE_AC()
{
    register int i,j;
    struct object *objects[MAX_SEND_OBJ];
    struct object *swap_obj;
    int top_index, bottom_index;
    float mom1, mom2, ONED_INTERP();

/*----------------------------------------------*/
    /* if tcd overlay priority logic, is now FALSE */
    /*----------------------------------------------*/
    if (tcd_priority)
    {
        /*--------------------------------*/

/* Zero out the arrays before sort */
    /*---------------------------------*/
    for (i=0; i<MAX_SEND_OBJ; i++) objects[i] = NULL;

top_index = 0;
    bottom_index = MAX_SEND_OBJ - 1;

/*-------------------------------------------------*/
    /* Sort objects by type and range/range_rate */
    /* Missiles go first, then A/C                     */
    /*-------------------------------------------------*/
    cur_object = ownship->next;
    while (cur_object != NULL)
    {
        if (cur_object->type == MISSILE) objects[top_index++] = cur_object;
        else objects[bottom_index--] = cur_object;

cur_object = cur_object->next;
    } for (i=0; i<top_index-1; i++)
        for (j=i+1; j<top_index; j++)
        {
            mom1 = objects[i]->ata_from;
            mom2 = objects[j]->ata_from;

if (mom2 < mom1)
            {
                swap_obj = objects[i];
                objects[i] = objects[j];
                objects[j] = swap_obj;
            }
        } for (i=bottom_index+1; i<MAX_SEND_OBJ-1; i++)
        for (j=i+1; j<MAX_SEND_OBJ; j++)
        {
            mom1 = objects[i]->ata_from;
            mom2 = objects[j]->ata_from;

if (mom2 < mom1)
            {
```

```
               swap_obj = objects[i];
               objects[i] = objects[j];
               objects[j] = swap_obj;
            }
      } for (i=0; i<MAX_SEND_OBJ;i++)
         if (objects[i] != NULL && objects[i] != cur_target)
         {
            tcd_obj = objects[i];
            DRAW_TCD_PLANE(objects[i]);
         } if (cur_target != NULL)
         DRAW_TCD_PLANE (cur_target);
   }
   /*--------------------------------*/
   /* draw all objects in list order */
   /*--------------------------------*/
   else
   {
      cur_object = ownship->next;

while (cur_object != NULL)
      {
         /*----------------------------------------------------------------*/
         /* current object is not target since the target is drawn last */
         /*----------------------------------------------------------------*/
         if (cur_object != cur_target)
         {
            tcd_obj = cur_object;

DRAW_TCD_PLANE (cur_object);
         }
         cur_object = cur_object->next;
      } if (cur_target != NULL)
      {
         tcd_obj = cur_target;
         DRAW_TCD_PLANE (cur_target);
      }
   }
}

/*************************************************************************/
/* draw tcd plane                                                        */
/*************************************************************************/
DRAW_TCD_PLANE (this_object)
struct object *this_object;
{
   char str[8];
   float vec[3];
   float ata_limit, tmp_droll;
   int i,obj_droll;
   int port_x,port_y,size,max_size = 250,min_size = 50,box_size;
   Matrix mat,proj_mat;
   float ONED_INTERP();

if (this_object != tcd_obj)
   {
      fprintf (stderr, "TCD DISPLAY ERROR #10\n");
   }

/*----------------------*/
   /* if in visible range */
   /*----------------------*/
   if (this_object->vis_range > 0.0)
   {
      /*----------------*/
      /* get roll error */
      /*----------------*/
      if (this_object->droll > M_PI_2)
         tmp_droll = M_PI - this_object->droll;
      else if (this_object->droll < -M_PI_2)
         tmp_droll = -M_PI - this_object->droll;
      else
         tmp_droll = this_object->droll;

obj_droll = 0;
```

```
/*------------------------------------------------*/
/* Find the screen limit for this roll plane */
/*------------------------------------------------*/
ata_limit = ONED_INTERP (tmp_droll, tcd_def->droll, tcd_def->ata,
          tcd_def->num_droll, &obj_droll);

/*----------------------*/
/* NOT in field of view*/
/*----------------------*/
if (this_object->ata > ata_limit && this_object->type != MISSILE
   && this_object->type != TANK)
{
   if (ribbons) DRAW_RIBBONS(this_object);
   pushmatrix ();
   pushviewport ();

/*------------------------------*/
   /* view port center for tcd box */
   /*------------------------------*/
   port_x = (int)ONED_INTERP (tmp_droll, tcd_def->droll,
          tcd_def->x, tcd_def->num_droll, &obj_droll);
   port_y = (int)ONED_INTERP (tmp_droll, tcd_def->droll,
          tcd_def->y, tcd_def->num_droll, &obj_droll);

if (fabs (this_object->droll) > M_PI_2) port_y = 2 * HUD_Y - port_y;

/*--------------------------------------*/
   /* Limit the viewport to on the screen */
   /*--------------------------------------*/
   if (port_y > 874) port_y = 874;
   else if (port_y < 150) port_y = 150;

if (port_x > 1129) port_x = 1129;
   else if (port_x < 150) port_x = 150;

/*--------------------------------*/
   /* Set viewport size (in pixels) */
   /*--------------------------------*/
   size = 75;
   viewport (port_x - size,port_x + size,port_y - size,port_y + size);

/*------------------------------*/
   /* Set up for Projection Matrix */
   /*------------------------------*/
   mmode (MPROJECTION);
   getmatrix (proj_mat);

/*--------------------------------------------------*/
   /* fov is based on radius of TCD box circle    */
   /* Magic number 1228 is the diameter in pixels */
   /*--------------------------------------------------*/
   perspective (2*size*status.fov/1228., 1.0,2.0,1.0e6);

/*------------------------------*/
   /* Set up for Model_View Matrix */
   /*------------------------------*/
   mmode (MVIEWING);
   loadmatrix (Identity);

/*------------------------*/
   /* rotate into NED system */
   /*------------------------*/
   rot (90.0 ,'x');
   rot (-90.0 ,'z');

/*------------------------*/
   /* Rotate for a/c position */
   /*------------------------*/
   rot (-ownship->phi, 'x');
   rot (-ownship->theta, 'y');
   rot (-ownship->psi, 'z');
   translate (-ownship->x, -ownship->y, -ownship->z);

/*------------*/
   /* Turn head */
   /*------------*/
   rot (-this_object->elev, 'y');
   rot (-this_object->az, 'z');
```

```
/*----------------------*/
/* Draw Earth/Sky and grid */
/*----------------------*/
c3f (skyblue);
clear();

/*-----------*/
/* Add ground */
/*-----------*/
c3f (green1);
bgnpolygon ();
   v3f (ground_array[0]);
   v3f (ground_array[1]);
   v3f (ground_array[2]);
   v3f (ground_array[3]);
endpolygon ();

/*-----------------------------------------------------------*/
/* Draw reference grid - each square is 5 miles on a side */
/*-----------------------------------------------------------*/
c3f (black);
for (i=0; i<2*NUM_GRID_LINES; i++)
{
   bgnline ();
      v3f (grid1[i]);
      v3f (grid2[i]);
   endline ();

bgnline ();
      v3f (grid3[i]);
      v3f (grid4[i]);
   endline ();
}

DRAW_PLANE(this_object);

mmode (MPROJECTION);
ortho2 (-1.,1.,-1.,1.);
mmode (MVIEWING);
loadmatrix (Identity);

/*------------------------*/
/* Designate locked target */
/*------------------------*/
if (this_object == cur_target) c3f(darkgreen);
else c3f (black);

linewidth (2);
bgnclosedline ();
   v2f (target_box[0]);
   v2f (target_box[1]);
   v2f (target_box[2]);
   v2f (target_box[3]);
endclosedline ();

cmov2 (0.,-.9);
sprintf(str,"%.1f",this_object->range * FT_TO_NM);
charstr(str);

linewidth (5);
bgnline ();
   vert[0] = -.9;
   vert[1] = 1.;
   v2f (vert);
   vert[1] = 1.0 - this_object->ata_from * 0.01111;
   v2f (vert);
endline ();

linewidth (10);
bgnline ();
   vert[0] = .9;
   vert[1] = -1.;
   v2f (vert);
   vert[1] = this_object->ata * 0.01111 - 1.0;
   v2f (vert);
endline ();

linewidth (1);
c3f (white);
vert[0] = .98;
```

```
            vert[1] = ata_limit * 0.01111 - 1.0;
            bgnline();
               v2f (vert);
               vert[0] = .82;
               v2f (vert);
            endline();

/*----------------------------------------------------------*/
         /* add the boxes that represent ata = alpha lim, 90, and 180 */
         /*----------------------------------------------------------*/
         mmode (MPROJECTION);
         ortho2 (-max_size,max_size,-max_size,max_size);
         mmode (MVIEWING);
         loadmatrix (Identity);
         viewport(port_x-max_size,port_x+max_size,port_y-max_size,port_y + max_size);

box_size = max_size - 1;
         DRAW_BOX(box_size);

box_size = min_size + (max_size-min_size)*(90/(180- ata_limit));
         DRAW_BOX(box_size);

box_size = min_size;
         DRAW_BOX(box_size);

/*----------------------------------------------------------*/
         /* Replace the projection matrix with the one that belongs there */
         /*----------------------------------------------------------*/
         mmode (MPROJECTION);
         loadmatrix (proj_mat);
         mmode (MVIEWING);
         popmatrix ();
         popviewport ();
      }
      /*-------------------*/
      /* IN field of view */
      /*-------------------*/
      else DRAW_PLANE(this_object);
   }
}
/**********************************************************************/
/* draw generic box                                                   */
/**********************************************************************/
DRAW_BOX(int size)
{
   short svert[4][2];

svert[0][0] = -size;
   svert[0][1] = -size;
   svert[1][0] =  size;
   svert[1][1] = -size;
   svert[2][0] =  size;
      svert[2][1] =  size;
   svert[3][0] = -size;
   svert[3][1] =  size;
   bgnclosedline();
      v2s (svert[0]);
      v2s (svert[1]);
      v2s (svert[2]);
      v2s (svert[3]);
   endclosedline();
}

/**********************************************************************/
/* draw ribbons                                                       */
/**********************************************************************/
DRAW_RIBBONS(obj)
struct object *obj;
{
   register int i,id;
   float fade_color[4];
   float vert[3];
   int tmp_counter = 0;

id = obj->id;

/*----------------------------------------------------------*/
   /* If the machine doesn't have alpha planes use patterns */
   /*----------------------------------------------------------*/
   if (alpha)
   {
```

```
    blendfunction (BF_SA, BF_MSA);
    c4f (tribbon);
    fade_color[0] = tribbon[0];
    fade_color[1] = tribbon[1];
    fade_color[2] = tribbon[2];
    fade_color[3] = 0.0;
}
else
{
    setpattern(3);
    c3f (tribbon);
} cur_ribbon = root_ribbon[id];
bgntmesh ();

do
{
    tmp_counter ++;

/*-------------------------------*/
    /* Fade the tail of the ribbon */
    /*-------------------------------*/
    fade_color[3] += 0.013;
    c4f (fade_color);

vert[0] = cur_ribbon->x + RIBB_WIDTH * (cur_ribbon->cospsi *
            cur_ribbon->sintha * cur_ribbon->sinphi - cur_ribbon->sinpsi *
            cur_ribbon->cosphi) - 2.0 * RIBB_WIDTH * cur_ribbon->costha *
            cur_ribbon->cospsi;
    vert[1] = cur_ribbon->y + RIBB_WIDTH * (cur_ribbon->cosphi *
            cur_ribbon->cospsi + cur_ribbon->sinpsi * cur_ribbon->sintha *
            cur_ribbon->sinphi) - 2.0 * RIBB_WIDTH * cur_ribbon->sinpsi *
            cur_ribbon->costha;
    vert[2] = cur_ribbon->z + RIBB_WIDTH * cur_ribbon->costha *
            cur_ribbon->sinphi + 2.0 * RIBB_WIDTH * cur_ribbon->sintha;
    v3f(vert);

vert[0] = cur_ribbon->x - RIBB_WIDTH * (cur_ribbon->cospsi *
            cur_ribbon->sintha * cur_ribbon->sinphi - cur_ribbon->sinpsi *
            cur_ribbon->cosphi) - 2.0 * RIBB_WIDTH * cur_ribbon->costha *
            cur_ribbon->cospsi;
    vert[1] = cur_ribbon->y - RIBB_WIDTH * (cur_ribbon->cosphi *
            cur_ribbon->cospsi + cur_ribbon->sinpsi * cur_ribbon->sintha *
            cur_ribbon->sinphi) - 2.0 * RIBB_WIDTH * cur_ribbon->sinpsi *
            cur_ribbon->costha;
    vert[2] = cur_ribbon->z - RIBB_WIDTH * cur_ribbon->costha *
            cur_ribbon->sinphi + 2.0 * RIBB_WIDTH * cur_ribbon->sintha;
    v3f(vert);

cur_ribbon = cur_ribbon->next;
    if (tmp_counter < 15)
    {
        for (i=0; i<10; i++)
        {
            cur_ribbon = cur_ribbon->next;
            if (cur_ribbon == root_ribbon[id]) break;
        }
    }
}
while (cur_ribbon != root_ribbon[id]);
endtmesh ();

if (alpha)
    blendfunction (BF_ONE, BF_ZERO);
else
    setpattern (1);
}
```

We claim:

1. A flight simulator system in which a simulator pilot's ownship having a nose and a tail, and target aircraft and friendly aircraft, each having a corresponding nose and tail and wingtip positions, are generated in real time on a display screen under control of flight simulator software, said generated display being a nominal 40° azimuth by 30° elevation display view centered around a forward fuselage reference line passing through the nose and tail of the ownship, said flight simulator system comprising:

a) means for obtaining positional, directional and velocity information defining the flight of the ownship, said friendly aircraft and said target aircraft;

b) means for performing predetermined calculations representing the flight of the ownship, said friendly aircraft and said target aircraft based upon said positional, directional and velocity information;

c) means for generating a target coordinate display showing said friendly aircraft and said target aircraft, said generating means including:
   i) means for determining whether each of said target aircraft and said friendly aircraft are visible to said ownship pilot;
   ii) means for determining whether each of said visible target and friendly aircraft are within said nominal 40° azimuth by 30° elevation display;
   iii) means for calculating screen positions for each of said visible target and friendly aircraft outside said nominal 40° azimuth by 30° elevation display based upon a roll angle between each of said visible target and friendly aircraft outside said nominal 40° azimuth by 30° elevation display and said ownship;
   iv) means for drawing each of said visible target and friendly aircraft outside said nominal 40° azimuth by 30° elevation display within a target display window disposed inside said nominal 40° azimuth by 30° elevation display using said calculated screen positions;
   v) means for drawing each of said visible target and friendly aircraft within said nominal 40° azimuth by 30° elevation display at the actual relative location of each said visible target.

2. The flight simulator system defined by claim 1 wherein said screen positions calculating means comprises a program for calculating the position of a predetermined one of said friendly or target aircraft according to a formula:

X coordinate = X screen center + screen radius*sin (DRoll)

Y coordinate = Y screen center + screen radius × cos (DRoll)

where DRoll is said roll angle, X screen center is ½ screen width in pixels, Y screen center is ½ screen height in pixels and screen radius is 0.9 * X screen center.

3. The flight simulator system defined by claim 2 wherein said drawing means using said calculated screen positions comprises means for displaying said predetermined aircraft within the target display window, said X coordinate and said Y coordinate being a center point of said predetermined aircraft within said target display window.

4. The flight simulator system defined by claim 1 wherein said target coordinate display generating means further comprises means for determining whether flight path ribbons are to be displayed and if said flight path ribbons are to be displayed drawing a series of connection polygons whose corners are defined by the positions of the wingtips of said target and friendly aircraft over a predetermined period of time.

5. The flight simulator system defined by claim 4 wherein said predetermined period of time is 10 seconds.

6. The flight simulator system defined by claim 3 further comprising means within the target display window for graphically indicating the position of said predetermined aircraft relative to the nose of the simulator pilot's ownship and a position of the pilot's ownship relative to the nose of said predetermined aircraft.

7. The flight simulator system defined by claim 6 wherein said indicating means comprises first and second analog bars within said target display window, said first analog bar representing an angle of said predetermined aircraft to the nose of the pilot's ownship and said second analog bar representing an angle of the pilot's ownship relative to the predetermined aircraft's nose wherein a length of said analog bars each respectively represent said angles and a rate of change of the lengths of the first and second bars conveys to the pilot a sense of which of said ownship and said predetermined target aircraft are obtaining a combat advantage and how rapidly said advantage is being obtained.

* * * * *